US011432190B2

(12) United States Patent
McCann et al.

(10) Patent No.: US 11,432,190 B2
(45) Date of Patent: Aug. 30, 2022

(54) AGGREGATION OF DATA FRAMES

(71) Applicant: BlackBerry Limited, Waterloo (CA)

(72) Inventors: Stephen McCann, Southampton (GB); Michael Peter Montemurro, Toronto (CA); James Randolph Winter Lepp, Ottawa (CA)

(73) Assignee: BlackBerry Limited, Waterloo (CA)

( * ) Notice: Subject to any disclaimer, the term of this patent is extended or adjusted under 35 U.S.C. 154(b) by 131 days.

(21) Appl. No.: 16/676,835

(22) Filed: Nov. 7, 2019

(65) Prior Publication Data

US 2020/0229032 A1  Jul. 16, 2020

Related U.S. Application Data

(60) Provisional application No. 62/791,171, filed on Jan. 11, 2019.

(51) Int. Cl.
| | |
|---|---|
| *H04L 12/413* | (2006.01) |
| *H04L 69/22* | (2022.01) |
| *H04L 1/16* | (2006.01) |
| *H04L 69/324* | (2022.01) |
| *H04W 28/06* | (2009.01) |
| *H04W 80/02* | (2009.01) |
| *H04L 101/622* | (2022.01) |
| *H04W 28/24* | (2009.01) |
| *H04W 84/18* | (2009.01) |
| *H04W 4/40* | (2018.01) |
| *H04L 5/00* | (2006.01) |
| *H04W 84/12* | (2009.01) |

(52) U.S. Cl.
CPC .......... *H04W 28/06* (2013.01); *H04L 5/0055* (2013.01); *H04L 61/6022* (2013.01); *H04W 4/40* (2018.02); *H04W 28/24* (2013.01); *H04W 80/02* (2013.01); *H04W 84/12* (2013.01); *H04W 84/18* (2013.01)

(58) Field of Classification Search
CPC ....... H04W 28/06; H04W 4/40; H04W 84/18; H04W 80/02; H04W 84/12; H04L 5/0055; H04L 61/0022; H04L 69/324
See application file for complete search history.

(56) References Cited

U.S. PATENT DOCUMENTS

| | | | |
|---|---|---|---|
| 2011/0116488 A1* | 5/2011 | Grandhi | H04B 7/0626 370/338 |
| 2017/0126363 A1* | 5/2017 | Wang | H04L 1/1671 |
| 2017/0230149 A1* | 8/2017 | Wang | H04L 1/1819 |
| 2017/0311284 A1* | 10/2017 | Basu Mallick | H04W 68/02 |

(Continued)

FOREIGN PATENT DOCUMENTS

| | | | |
|---|---|---|---|
| WO | 2015/044424 A1 | 4/2015 | |
| WO | 2016/144887 A1 | 9/2016 | |
| WO | WO-2020009389 A1 * | 1/2020 | ............ H04W 28/02 |

OTHER PUBLICATIONS

IEEE Access, Selinis et al., The Race to 5G Era; LTE and Wi-Fi (Year: 2018).*

(Continued)

*Primary Examiner* — Un C Cho
*Assistant Examiner* — Peter K Mak
(74) *Attorney, Agent, or Firm* — Trop, Pruner & Hu, P.C.

(57) ABSTRACT

In some examples, a device aggregates data frames into an aggregated data frame for communication in an Outside the Context of a Basic Service Set (OCB) mode.

13 Claims, 8 Drawing Sheets

(56) References Cited

U.S. PATENT DOCUMENTS

| | | | |
|---|---|---|---|
| 2019/0007253 A1* | 1/2019 | Cavalcanti | H04L 27/2662 |
| 2019/0222680 A1* | 7/2019 | Chu | H04W 72/046 |
| 2019/0268827 A1* | 8/2019 | Kim | H04W 48/08 |
| 2019/0280919 A1* | 9/2019 | Sadeghi | H04L 41/0803 |
| 2019/0288763 A1* | 9/2019 | Oteri | H04B 7/0645 |
| 2019/0327664 A1* | 10/2019 | Zhang | H04W 76/18 |
| 2020/0059290 A1* | 2/2020 | Pan | H04B 7/0695 |
| 2020/0159950 A1* | 5/2020 | Bodin | G06F 40/279 |
| 2020/0228948 A1* | 7/2020 | Watfa | H04L 67/16 |
| 2021/0084542 A1* | 3/2021 | Ahmad | H04W 28/24 |

OTHER PUBLICATIONS

Banos-Gonzalez et al., IEEE 802.11ah: A Technology to Face the IoT Challenge, MDPI, Sensors 2016 (21 pages).
Alexandre Petrescu, Transmission of IPv6 Packets over IEEE 802.11 Networks Outside the Context of a Basic Service Set, Technical Report • Jun. 2014 (32 pages).
Lin et al., Frame Aggregation and Optimal Frame Size Adaptation for IEEE 802.11n WLANs, IEEE GLOBECOM 2006 (6 pages).
Canadian Intellectual Property Office, Notification of Transmittal of the International Search Report and Written Opinion of the International Searching Authority, or the Declaration for PCT/CA2019/051855 dated Feb. 26, 2020 (1 page).
Canadian Intellectual Property Office, International Search Report for PCT/CA2019/051855 dated Feb. 26, 2020 (4 pages).
Canadian Intellectual Property Office, Written Opinion of the International Searching Authority for PCT/CA2019/051855 dated Feb. 26, 2020 (5 pages).
(1 of 2) IEEE P802.11-REVmd™/D2.0, IEEE P802.11-REVmdTM/D2.0, Draft Standard for Information technology—Telecommunications and information exchange between systems, Local and metropolitan area networks—Specific requirements, Part 11: Wireless LAN Medium Access Control (MAC) and Physical Layer (PHY) Specifications, Dec. 2018 (pp. 1-2300).
(2 of 2) IEEE P802.11-REVmd™/D2.0, IEEE P802.11-REVmdTM/D2.0, Draft Standard for Information technology—Telecommunications and information exchange between systems, Local and metropolitan area networks—Specific requirements, Part 11: Wireless LAN Medium Access Control (MAC) and Physical Layer (PHY) Specifications, Dec. 2018 (pp. 2301-4601).
Association of Radio Industries and Businesses, ARIB Standard, Association of Radio Industries and Businesses, ARIB STD-T109 Version 1.3, English Translation, 700 MHz Band, Intelligent Transport Systems, Jul. 2017 (245 pages).
U.S. Department of Transportation, Dedicated Short-Range Communications Roadside Unit Specifications, FHWA-JPO-17-589, Apr. 28, 2017 (126 pages).
IEEE Vehicular Technology Society, IEEE Std 1609.4™-2016, IEEE Standard for Wireless Access in Vehicular Environments (WAVE)—Multi-Channel Operation, 2016 (94 pages).
Fischer et al., MAC Service Updates for NGV, IEEE 802.11-19/0276r4, May 2019 (19 pages).
SAE International, Surface Vehicle Standard, J2945™/1, On-Board System Requirements for V2V Safety Communications, Mar. 2016 (127 pages).
IEEE Standards Association, IEEE Standard for Information Technology—Telecommunications and Information Exchange Between Systems Local and Metropolitan Area Networks—Specific Requirements Part 11: Wireless LAN Medium Access Control (MAC) and Physical Layer (PHY) Specifications, IEEE Std 802.11 2016, 3534 pages.
IEEE Standard for Information technology—Telecommunications and information exchange between systems Local and metropolitan area networks—Specific requirements, Part 11: Wireless LAN Medium Access Control (MAC) and Physical Layer (PHY) Specifications Amendment 4: Enhancements for Very High Throughput for Operation in Bands below 6 GHz, IEEE Std 802.11ac™-2013 (425 pages).
IEEE Standard for Information technology (IEEE Std 802.11p-2010)—Telecommunications and Information Exchange Between Systems Local and Metropolitan Area Networks—Specific Requirements Part 11: Wireless LAN Medium Access Control (MAC) and Physical Layer (PHY) Specifications, Amendment 6: Wireless Access in Vehicular Environments, Jul. 15, 2010 (51 pages).
IEEE Standard for Wireless Access in Vehicular Environments (WAVE)—Networking Services, IEEE Vehicular Technology Society, IEEE Std 1609.3™-2016 (160 pages).
IEEE P802.11ax™/D2.2, Draft Standard for Information technology—Telecommunications and information exchange between systems Local and metropolitan area networks—Specific requirements, Part 11: Wireless LAN Medium Access Control (MAC) and Physical Layer (PHY) Specifications, Amendment 6: Enhancements for High Efficiency WLAN, Feb. 2018 (620 pages).
3GPP TS 36.321 V14.11.0 Technical Specification 3rd Generation Partnership Project; Technical Specification Group Radio Access Network; Evolved Universal Terrestrial Radio Access (E-UTRA); Medium Access Control (MAC) protocol specification (Release 14) (Jun. 2019) (110 pages).
Draft ETSI EN 302 663 V1.3.0 Intelligent Transport Systems (ITS); ITS-G5 Access layer specification for Intelligent Transport Systems operating in the 5 GHz frequency (May 2019) (24 pages).
Ericsson, 3GPP QoS concepts, Power Point Presentation, 2010 (24 pages).
Lepp et al., U.S. Appl. No. 16/677,813 entitled Aggregating Messages Into a Single Transmission filed Nov. 8, 2019 (45 pages).
Wikipedia, Frame aggregation, Feb. 22, 2019 (2 pages).
European Patent Office, Extended European Search Report for Appl. No. 19909544.9 dated Jun. 22, 2022 (6 pages).
IEEE Draft; Draft P02.11 REVMD_D0.0, IEEE-SA, Piscataway, NJ, USA, LAN/WAN Standard Committee of the IEEE Computer Society: "Part 11: Wireless LAN Medium Access Control (MAC) and Physical Layer (PHY) Specifications", vol. 802.11 md drafts; 802.11 drafts; 802.11 m drafts, No. D0.0 May 8, 2017 (May 8, 2017), pp. 1-3532 (Split into 43 separate documents).

* cited by examiner

Figure 9-970 - A-MPDU format

Figure 9-972 - A-MPDU subframe format

Figure 9-973 - MPDU delimiter (non-DMG)

Figure 9-974 - MPDU delimiter (DMG)

AGGREGATION OF DATA FRAMES

This application claims the benefit under 35 U.S.C. § 119(e) of U.S. Provisional Application Ser. No. 62/791,171, filed Jan. 11, 2019, which is hereby incorporated by reference.

BACKGROUND

Electronic devices can communicate over wired or wireless networks. Wireless networks can include a wireless local area network (WLAN), which includes wireless access points (APs) to which devices are able to wirelessly connect. Other types of wireless networks include cellular networks that comprise wireless access network nodes to which devices are able to wirelessly connect.

For improved throughput, frames sent over a network can be aggregated. However, aggregation of frames may not be useable in some scenarios.

BRIEF DESCRIPTION OF THE DRAWINGS

Some implementations of the present disclosure are described with respect to the following figures.

Figure 1A:
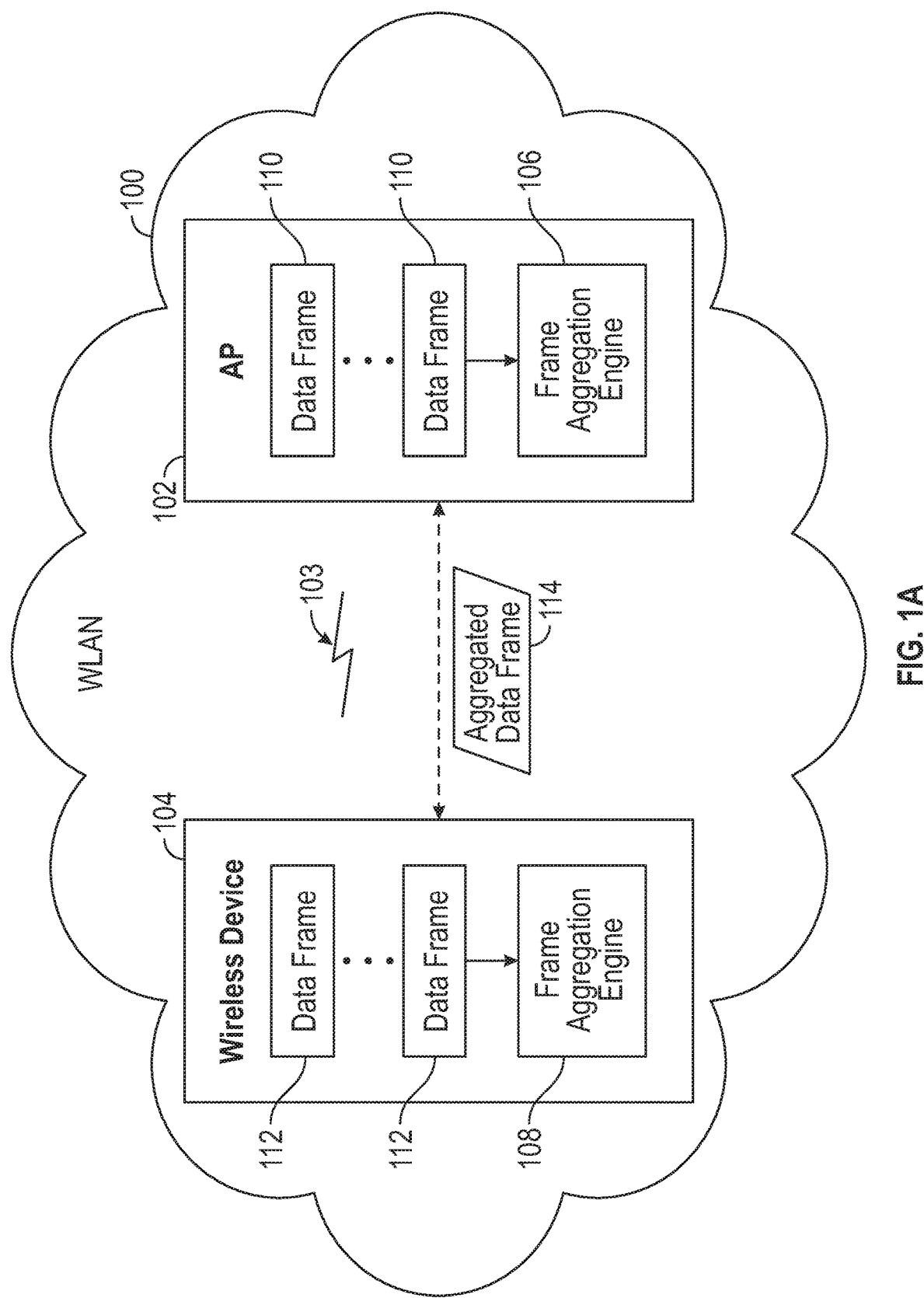
FIGS. 1A and 1B are block diagrams of example communication arrangements, according to some implementations of the present disclosure.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

Table 1 below sets forth descriptions of acronyms or abbreviations used in the present description.

TABLE 1

| Acronym/Abbreviation | Full text | Brief Description |
|---|---|---|
| A-MPDU | Aggregate Medium Access Control (MAC) Protocol Data Unit (A-MPDU) | A structure that contains one or more MPDUs and is transported by a physical layer (PHY) as a single PHY service data unit (PSDU). |
| A-MSDU | Aggregate Medium Access Control (MAC) Service Data Unit (A-MSDU) | A structure that contains one or more MSDUs and is transported within a single (un-fragmented) data medium access control (MAC) protocol data unit (MPDU). |
| BSS | Basic Service Set | For a wireless local area network (WLAN), this includes an Access Point and its connected devices. |
| ITS | Intelligent Transport System | |
| MPDU | MAC Protocol Data Unit | |
| NGV | Next Generation Vehicle | Sometimes referred to as "Next Generation Vehicle to Anything." New term for a device operating in an enhanced OCB mode. |
| OCB | Outside the Context of a BSS | For a WLAN, this is a term for ad-hoc communications between devices, such as in a vehicular context. "OCB" can also refer to "extended OCB" that extends features of OCB beyond those of current standards. |
| PHY | Physical Layer | IEEE 802.11 term for a wireless physical layer |
| RSU | Road Side Unit | |
| STA | STAtion | IEEE 802.11 wireless device. This can include both a wireless device and an access point. |
| TMG | Traffic Management Gateway | |
| UACK | Un-associated, acknowledge | New operation mode of an NGV device. Note: The IEEE 802.11ax D5.0 uses the term "unassociated". |
| UNACK | Un-associated, Non-acknowledge | New operation mode of an NGV device. Note: The IEEE 802.11ax D5.0 uses the term "unassociated". |
| V2X | Vehicle to Anything | Anything can be Vehicle, Infrastructure etc |
| WSMP | Wave Short Message Protocol | A protocol defined by IEEE 1609 |

In some examples, communications in a network, such as a WLAN, are governed by Institute of Electrical and Electronic Engineers (IEEE) or Wi-Fi Alliance standards. Some IEEE standards mentioned in the present disclosure include: IEEE 802.11ax (High Efficient WLAN task group within the IEEE 802.11 project), IEEE 802.11bd (Next Generation V2X (Vehicle to anything) task group within the IEEE 802.11 project), IEEE 802.11md or IEEE 802.11 REVmd (Revision and maintenance task group within the IEEE 802.11 project).

Communications can be governed by other standards (other or additional IEEE standards or other types of standards) in other examples.

In communications according to IEEE 802.11, frame aggregation can be performed, in which data frames are aggregated together into a single transmission. Frame aggregation (sometimes called "Jumbo frames") is a feature of the IEEE 802.11-2016 WLAN standard that increases throughput by sending two or more data frames in a single transmission. This feature is being enhanced by the IEEE 802.11ax (High Efficiency WLAN) amendment and the IEEE 802.11 REVmd (maintenance) revision.

Each frame transmitted by an IEEE 802.11 device (a device that communicates according to the IEEE 802.11 standards) has a significant amount of overhead, including radio level headers, Media Access Control (MAC) frame fields, inter-frame spacing, and acknowledgment of transmitted frames. At the highest data rates, and depending on the length of the frame, this overhead can consume more bandwidth than the payload data frame. To address this issue, the IEEE 802.11-2016 standard defines two types of frame aggregation: Aggregated MAC Service Data Unit (A-MSDU) aggregation and Aggregated MAC Protocol Data Unit (A-MPDU) aggregation. Both types of frame aggregation group several data frames into one larger frame. Because management information is specified only once per frame, the ratio of payload data to the total volume of data is higher, allowing higher communication throughput.

Packing multiple frames into a single transmission results in a longer transmission (as opposed to a transmission that includes just a single data frame), but reduces inter-frame time gaps and other overheads.

MSDU aggregation relies on the fact that many wireless access points (APs) and many mobile client protocol stacks use Ethernet as their "native" frame format. MSDU aggregation collects Ethernet frames to be transmitted to one destination or group-addressed destinations and wraps the Ethernet frames in a single IEEE 802.11 frame. This is efficient because Ethernet headers are much shorter than IEEE 802.11 headers. An A-MSDU contains only MSDUs whose destination address (DA) and sender address (SA) parameter values map to the same receiver address (RA) and transmitter address (TA) values, i.e., all the MSDUs are intended to be received by a single receiver, and all the MSDUs are transmitted by the same transmitter.

Note that it is possible to have different DA and SA parameter values in A-MSDU subframe headers of the same A-MSDU as long as they all map to the same Address 1 and Address 2 parameter values.

MPDU aggregation (A-MPDU) also collects Ethernet frames to be transmitted to a single destination, but each frame still contains its own IEEE 802.11 MAC header within the wrapped-up A-MPDU. Normally this is less efficient than MSDU aggregation, but is actually more efficient in environments with high error rates, because of a mechanism called Selective Block acknowledgement. The Selective Block acknowledgement mechanism allows each of the aggregated data frames to be individually acknowledged or retransmitted if affected by an error.

The IEEE 802.11p amendment (part of IEEE 802.11-2012) specifies usage of 5, 10, and 20 megahertz (MHz) wide channels in the 5.9 gigahertz (GHz) band for a vehicular environment (in which communications occur between vehicles, between vehicles and road side units (RSUs), or between vehicles and other devices). IEEE 802.11p is an extension of IEEE 802.11a, where frames are transmitted in an un-associated state.

IEEE 802.11p-compliant devices can use a special operation mode referred to as Outside the Context of a BSS (OCB). No authentication/association has to be performed before the devices can communicate over a network with another device. The only parameter to be configured is the channel (central frequency and bandwidth) to communicate on. The channel is known a priori. The channel is set during the 'ocb join' operation (e.g., sent via netlink message from a user space).

IEEE 802.11bd (Next Generation V2X) is a task group within IEEE 802.11 that will consider future extensions to the IEEE 802.11p (enhanced OCB) amendment. Within the context of this disclosure, extensions to IEEE 802.11p are referred to as NGV (Next Generation Vehicle, or Next Generation V2X) mode.

1. Issues

Aggregated IEEE 802.11 data frames cannot be currently used for the OCB mode of operation (e.g., IEEE 802.11p vehicular communications). The existing methods to indicate, negotiate support, and transmit multiple frames in a single transmission rely on "association" between STAs. The IEEE 802.11p direct communication mode does not support association.

As a result, vehicular systems using IEEE 802.11p—OCB (e.g., Dedicated Short Range Communication (DSRC)) cannot take advantage of aggregated data frames which enable longer messages to be efficiently transmitted between devices.

Aggregated data frames have been specified for the more recent physical layer amendments in IEEE 802.11, such as IEEE 802.11n, IEEE 802.11ac, IEEE 802.11ad, and IEEE 802.11ax, but only for unicast communication and only after a successful BlockACK agreement negotiation. OCB operation with aggregate data frames has not been considered and indeed prior IEEE 802.11 standards do not support this.

When using OCB mode, both broadcast and unicast traffic over a network (e.g., over the air) are permitted, but the broadcast traffic is unacknowledged. Additionally, because OCB mode has no association step (in which a device that wishes to communicate over a network first associates with an access point (AP) of the network), some of the parameters and capabilities typically discovered/indicated/exchanged/negotiated as part of the association process are not available.

A side effect of aggregating frames at the IEEE 802.11 layer is that an upper network layer, such as a WAVE Short Message Protocol (WSMP) layer within a device, as defined in the IEEE 1609.3 standard, will have to be informed about this capability (using inter-layer communication within a device) and sometimes negotiate this capability with neighboring devices.

2. Implementations According to Some Examples

FIG. 1A is a block diagram of an example communication arrangement that includes devices in a wireless local area network (WLAN) 100.

A WLAN can operate according to the IEEE 802.11 or Wi-Fi Alliance Specifications. In other examples, other types of wireless networks can be employed, such as a Bluetooth link, a ZigBee network, and so forth. Additionally, some wireless networks can enable Internet of Things (IoT), such as wireless access networks according to LTE Advanced for Machine-Type Communication (LTE-MTC), narrowband IoT (NB-IoT), LTE-V2X using PC5 mode 3 or 4, WLAN, Bluetooth, ZigBee, 5G, 5G unlicensed and so forth.

Other types of wireless networks can be employed in other examples. For example, a wireless network can include a cellular network. An example cellular network can operate according to the Long-Term Evolution (LTE) standards as provided by the Third Generation Partnership Project (3GPP). The LTE standards are also referred to as the Evolved Universal Terrestrial Radio Access (E-UTRA) standards. In other examples, other types of cellular networks can be employed, such as second generation (2G) or third generation (3G) cellular networks, e.g., a Global System for Mobile (GSM) cellular network, an Enhanced Data rates for GSM Evolution (EDGE) cellular network, a Universal Terrestrial Radio Access Network (UTRAN), a Code Division Multiple Access (CDMA) 2000 cellular network, and so forth. In further examples, cellular networks can be fifth generation (5G) new radio (NR) or beyond cellular networks.

In FIG. 1A, the devices that are in the WLAN 100 include an AP 102 and a wireless device 104. Although just one AP 102 and one wireless device 104 are shown in FIG. 1, it is noted that in other examples there can be more than one AP 102 and/or more than one wireless device 104.

The wireless device 104 can include any type of electronic device that can communicate wirelessly. Examples of electronic devices include any or some combination of the following: a vehicle, an electronic control unit in a vehicle, a desktop computer, a notebook computer, a tablet computer, a smartphone, a game appliance, an IoT device (e.g., a camera, a sensor, a vehicular component, etc.), a wearable device (e.g., a smart watch, smart eyeglasses, a head-mounted device, etc.), a server computer, a storage device, a road side unit (RSU), and so forth.

The AP 102 can refer to any type of wireless access network node that supports wireless communications by wireless devices within the coverage area of the AP 102. The AP 102 can include a WLAN AP, or a cellular access network node, such as a base station, an Evolved Node B (eNB), and so forth.

In accordance with some implementations of the present disclosure, the AP 102 includes a frame aggregation engine 106, and the wireless device 104 includes a frame aggregation engine 108.

As used here, an "engine" can refer to a hardware processing circuit, which can include any or some combination of a microprocessor, a core of a multi-core microprocessor, a microcontroller, a programmable integrated circuit, a programmable gate array, a digital signal processor, or another hardware processing circuit. Alternatively, an "engine" can refer to a combination of a hardware processing circuit and machine-readable instructions (software and/or firmware) executable on the hardware processing circuit.

The frame aggregation engine 106 is able to aggregate multiple data frames 110 from an entity within the AP 102 (or from another node connected to the AP 102 either wirelessly or over a wired connection) into an aggregated data frame. Similarly, the frame aggregation engine 108 in the wireless device 104 can aggregate data frames 112 from an entity within the wireless device 104 (or from another node connected wirelessly or over a wired connection to the wireless device 104) into an aggregated data frame.

A "data frame" can refer to any unit of data that can be separately communicated or separately identifiable. For example, a data frame can include an MPDU or an MSDU.

An aggregated data frame 114 can be produced by the frame aggregation engine 106 or the frame aggregation engine 108, and can be sent from the AP 102 to the wireless device 104, or vice versa, over a wireless link 103 between the AP 102 and the wireless device 104.

In accordance with some implementations of the present disclosure, the aggregation of the multiple data frames (110 or 112) into an aggregated data frame (e.g., 114) is for communication over a communication link in an OCB mode.

Note further that each frame aggregation engine 106 or 108 can disassemble a received aggregated data frame (e.g., 114) into individual data frames that have been aggregated into the aggregated data frame.

Figure 1B:
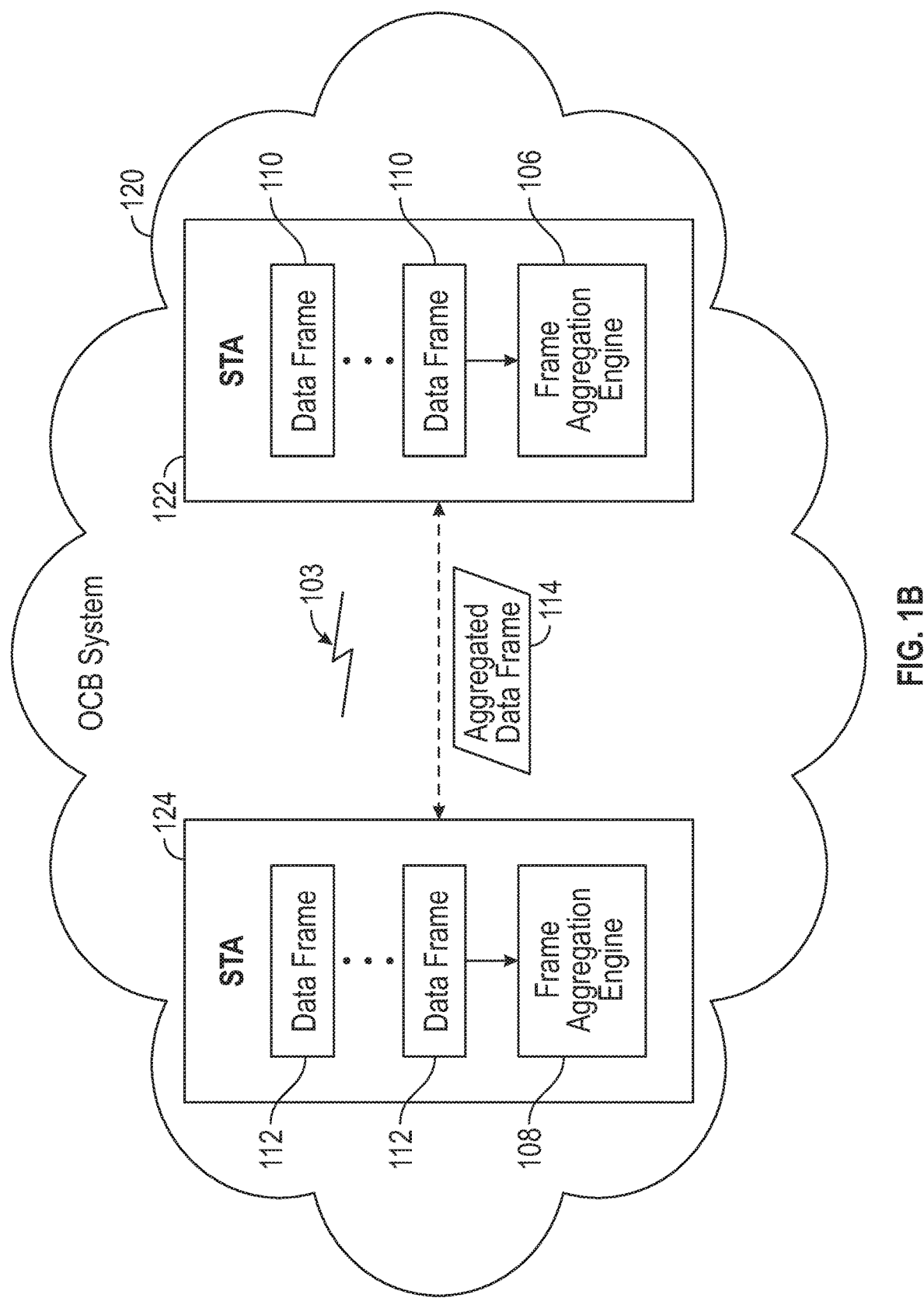

FIG. 1B illustrates another example communication arrangement that includes an OCB system 120 in which an STA 122 is able to communicate with another STA 124 in the OCB mode. The STAs 122 and 124 can include the frame aggregation engine 106 and 108, respectively, for aggregating data frames 110 and 112, respectively, in the manner discussed above. In FIG. 1B, the aggregation of the multiple data frames (110 or 112) into an aggregated data frame (e.g., 114) is for communication over a communication link between the STAs 122 and 124 in an OCB mode 2.1 Implementation 1: A-MPDU and A-MSDU Data Frames A general implementation is to enable aggregated IEEE 802.11 data frames for IEEE 802.11bd (i.e. extended IEEE 802.11p) operation, specifically A-MPDUs and A-MSDUs to be used in an extended OCB mode referred to as an NGV mode according to some examples of the present disclosure. The implementation to support the NGV mode may include a new IEEE 802.11 NGV physical layer for an extended OCB mode. In such examples, the frame aggregation engine 106 or 108 can include the IEEE 802.11 NGV physical layer in the AP 102 or the wireless device 104, respectively.

In some examples, aggregating multiple data frames can include removing Medium Access Control (MAC) headers of the multiple data frames and aggregating remaining portions of the multiple data frames without the MAC headers into the aggregated data frame. Such aggregation produces an A-MSDU.

In further examples, aggregating multiple data frames can include aggregating the multiple data frames with MAC headers. Such aggregation produces an A-MPDU.

Although reference is made to a "NGV mode" in this discussion, it is noted that the extended OCB mode can be designated with another name in other examples. More generally, the NGV mode (or extended OCB mode) is a mode in which a device is able to communicate aggregated data frames over a wireless link in an OCB mode of operation (i.e., where association and authentication do not have to be first performed).

Frame aggregation in IEEE 802.11 systems can improve efficiency. For example, as the data rates of a physical (PHY) layer increase, aggregating more data in a single access of the medium provides for a more efficient use of communication resources, and supports more effective coexistence of fast and slow data rates over the medium.

Sections 2.1.1 and 2.1.2 describe two new modes of IEEE 802.11bd operation that can be employed for A-MPDU frames, as A-MSDU frames do not have block acknowledgements:

2.1.1 Unassociated, No Acknowledgement (UNACK) Mode

The existing IEEE 802.11p (OCB) broadcasts data frames in an unassociated state (e.g., a device transmits data frames before the device has associated with an AP), and in an unacknowledged mode (no acknowledgment of receipt of data frames is provided by a receiver). To provide backward compatibility with the IEEE 802.11p architecture, an NGV mode aggregated frame (A-MPDU) may be created for use in a new UNACK frame to provide an indication to a receiving device (AP 102 or wireless device 104) that the receiving device does not have to acknowledge an A-MPDU sent by a transmitting device (wireless device 104 or AP 102).

In some examples, an UNACK frame is a new IEEE 802.11 action frame with an UNACK indicator to indicate no acknowledgment mode. The UNACK indicator can be a special value in a header of the A-MPDU, for example. In other examples, the UNACK indicator can include a management or control frame (e.g., an action frame) with an indicator of the unacknowledged mode to cause operation in the unacknowledged mode.

Figure 2:
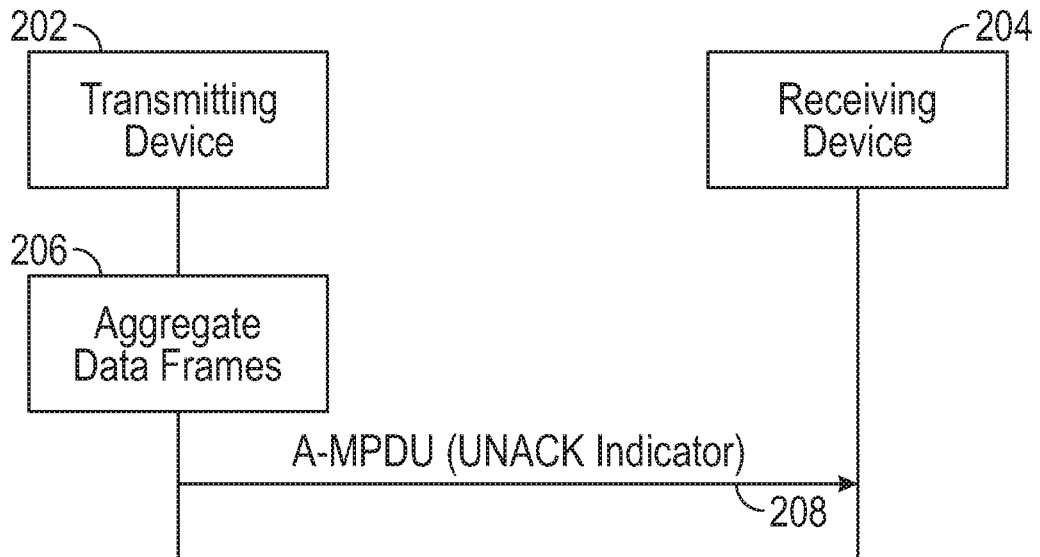
FIGS. 2 and 3 are flow diagrams of processes according to some implementations of the present disclosure.

FIG. 2 shows an example of an NGV mode of operation without acknowledgement. It is assumed that the communication shown in FIG. 2 is prior to association of a wireless device with an AP.

A transmitting device 202 (the wireless device or the AP) aggregates (at 206) data frames into an aggregated data frame, such as an A-MPDU.

As part of NGV mode communications of an A-MPDU without acknowledgment, the transmitting device 202 sends (at 208) the A-MPDU that includes an UNACK indicator to a receiving device 204 (the AP or the wireless device). When the A-MPDU is decoded by the receiving device 204, the UNACK indicator indicates that no acknowledgment of the A-MPDU is to be sent to the transmitting device 202.

2.1.2 Unassociated Acknowledgement (UACK) Mode

In other examples, it may be beneficial to create an unassociated acknowledged mode for the NGV mode. In such examples, a received A-MPDU is acknowledged by the receiving device with either a unicast or broadcast acknowledgement frame.

An NGV mode aggregated frame (A-MPDU) may be created for use in a new UACK frame that has a UACK indicator to indicate that the A-MPDU is to be acknowledged with an acknowledgment frame sent by the receiving device to the transmitting device. In other examples, the UACK indicator can include a management or control frame (e.g., an action frame) with an indicator of the acknowledged mode to cause operation in the acknowledged mode.

If a UACK frame is received by a receiving NGV mode device (a device operating in the NGV mode), the UACK frame can be passed up to the upper layers of the device. As the majority of NGV mode aggregated frames are broadcast and not acknowledged, UACK frames are designed to be infrequently transmitted and so are more efficiently processed by the upper layers outside of the IEEE 802.11 stack (that includes the protocol layers supporting IEEE 802.11 communications).

The UACK frame is a new IEEE 802.11 action frame with a UACK indicator.

Figure 3:
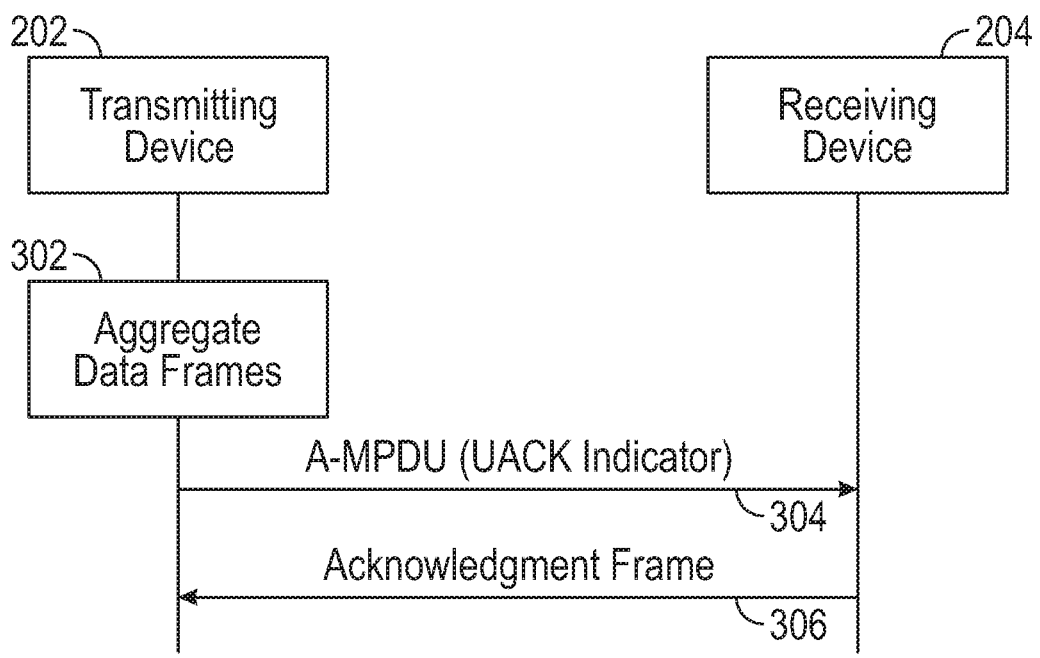

FIG. 3 shows an example of an NGV mode of operation with acknowledgement. It is assumed that the communication shown in FIG. 3 is prior to association of a wireless device with an AP.

The transmitting device 202 (the wireless device or the AP) aggregates (at 302) data frames into an aggregated data frame, such as an A-MPDU.

As part of NGV mode communications of an A-MPDU with acknowledgment, the transmitting device 202 sends (at 304) the A-MPDU (with a UACK indicator) to the receiving device 204 (the AP or the wireless device).

If the receiving device 204 determines based on decoding the A-MPDU that acknowledgment of the A-MPDU is to be performed, the receiving device 204 acknowledges receipt of the A-MPDU by sending (at 306) an acknowledgment frame to the transmitting device 202.

In some examples, the use of the UACK mode will have benefits for time dependent data. Acknowledgements can be provided to the transmitting device of time-dependent data, so that the transmitting device knows whether a receiving device (possibly one of multiple receiving devices) received the A-MPDU within a specified time limit. If the specified time limit was not met (i.e., the transmitting device does not receive an acknowledgement of the A-MPDU from the one or more receiving devices), the transmitting device may decide to take another action to re-send or repeat the transmission of the A-MPDU.

IEEE 802.11ac already describes a maximum aggregation length in terms of time (rate*length) as opposed to hard numbers for length in bits. This can deter frame aggregation for slower rate communications, and can allow frame aggregation on faster rate communications, and can also be applied to devices operating in an NGV mode.

2.1.3 Changes to Standards

In accordance with some examples of the present disclosure, some standards may be modified to support data frame aggregation in the extended OCB mode (NGV mode) as discussed.

Some additions and changes may be made to current IEEE 802.11 amendments (e.g., IEEE 802.11bd, IEEE 802.11ax, and IEEE 802.11md) to ensure that aggregated IEEE 802.11 frames (e.g., A-MPDU and A-MSDU) are available for IEEE 802.11 devices.

2.1.3.1 IEEE 802.11bd Changes

This IEEE 802.11bd amendment is amended to introduce the NGV mode mechanism, possibly as a new physical layer in a device. Within the IEEE 802.11bd amendment, this can be achieved by copying another physical layer (such as TV White Space—TVWS) and changing various parameters for an NGV mode. For example, a new TXVECTOR FORMAT parameter "NGV" (or similar) is introduced to allow specific rules for an NGV mode.

With regards to aggregated IEEE 802.11 frames (e.g., A-MPDU and A-MSDU), A-MSDU does not typically have block acknowledgements (block-ack). As a result, implementations of the present disclosure can extend the current A-MSDU behavior to allow operation within an NGV mode device. In other words, A-MSDU block acknowledgements and non-acknowledgement do not have to be employed for NGV mode.

For A-MPDUs, implementations of the present disclosure can add a new UNACK operation, as mentioned in section 2.1.1 above. This UNACK operation is employed as the existing IEEE 802.11 block acknowledgement and non-acknowledgment modes of A-MPDUs are for when devices are associated. In NGV mode, devices are un-associated, so a new A-MPDU UNACK operation is employed.

A new aggregated IEEE 802.11 frame acknowledgment frame (e.g., an un-associated acknowledge mode—UACK) may also be added. In such examples, a received aggregated frame is acknowledged by either a unicast or broadcast frame. This will have benefits for time dependent data (e.g. part of a long message has been lost).

Section A.1 below provides further examples of changes to IEEE 802.11bd according to some examples.

2.1.3.2 IEEE 802.11ax and IEEE 802.11md Changes

If all the changes to the IEEE 802.11bd amendment noted above in Section 2.1.3.1 and in Section A.1 cannot be accomplished, then these two IEEE 802.11 amendments (IEEE 802.11ax and IEEE 802.11md) can be updated so that UNACK and UACK operations can be defined for other devices (e.g., an IEEE 802.11bd—NGV device) other than just HE (High Efficiency) and DMG (Directional Multi Gigabit) devices.

Sections A.2 and A.3 below provide further examples of changes to IEEE 802.11md and 802.11ax, respectively, according to some examples.

2.2 Implementation 2: OCB Capability Exchange

IEEE 1609 provides a family of standards for Wireless Access in Vehicular Environments (WAVE).

As noted above, a side effect of aggregating frames at the IEEE 802.11 layer of a device is that an upper network layer, such as the WSMP layer within the device, as defined in the IEEE 1609.3 standard, will have to be informed about the data frame aggregation capability (using inter-layer communication within the device), and sometimes negotiate this capability with neighboring devices.

Figure 4:
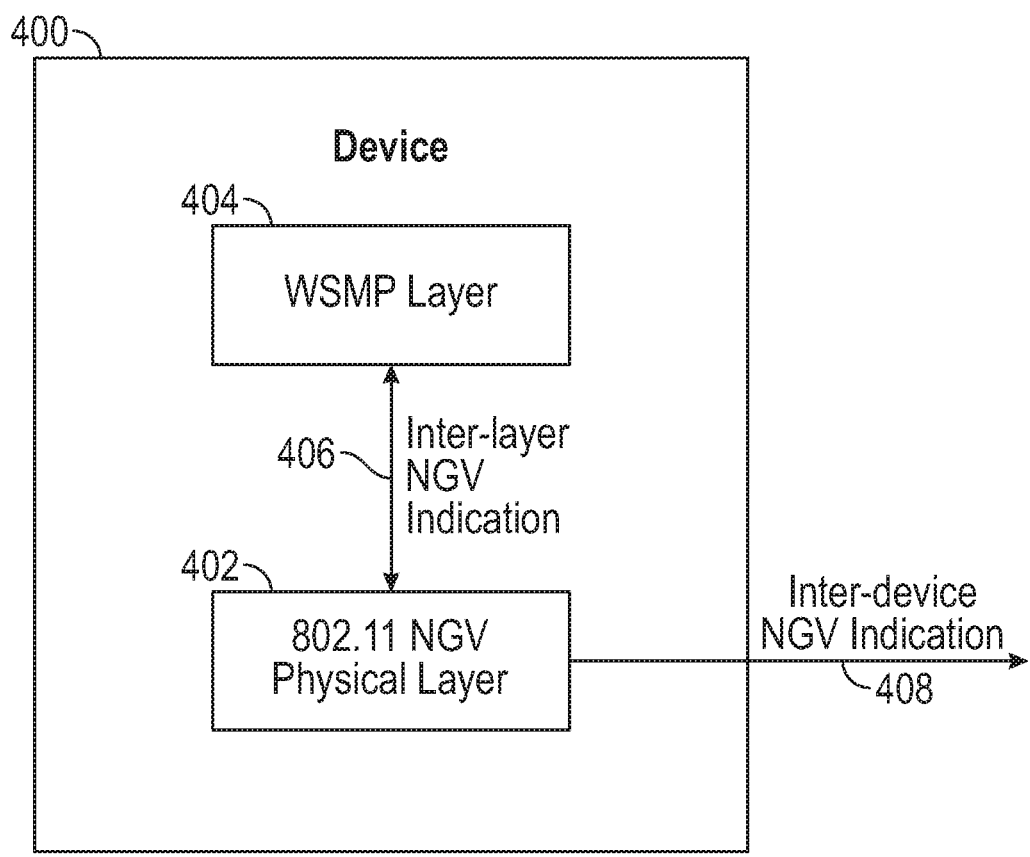
FIG. 4 is a block diagram of a device according to some examples of the present disclosure.

FIG. 4 shows an example device 400 (which can include the wireless device 104 or AP 102 of FIG. 1) that includes an 802.11 NGV physical layer 402 that supports frame aggregation in the NGV mode, according to some implementations of the present disclosure.

The device 400 further includes a WSMP layer 404 (that operates according to IEEE 1609.3) that is able to perform inter-layer communication with the 802.11 NGV physical layer 402. Note that there are intermediate layers between the 802.11 NGV physical layer 402 and the WSMP layer 404 that are not shown in FIG. 4. Such intermediate layers can include a MAC layer and a logical link layer, for example. The WSMP layer 404 supports vehicular communications by including control information in data packets being communicated, where such control information can include a priority of a data packet, a data rate for the data packet, a power for the data packet, and so forth.

The WSMP layer 404 is able to perform data fragmentation (in which a data packet is fragmented into multiple smaller pieces) based on a fixed IEEE 802.11p maximum frame size (e.g., 2,312 octets according to 1609.4-2016). Enabling aggregated frames within IEEE 802.11bd will break this assumption of fragmentation. The IEEE 1609 standards are updated to determine:

When an IEEE 802.11p frame is replaced by an NGV mode aggregated frame
That a device supports any one or more of:
Only NGV mode aggregated frames,
NGV mode aggregated frames and legacy IEEE 802.11p frames,
Legacy IEEE 802.11p frames.

In some examples, the 802.11 NGV physical layer 402 and the WSMP layer 404 are able to exchange capabilities with one another, including the capability of frame aggregation for the OCB mode of operation. The 802.11 NGV physical layer 402 and the WSMP layer 404 do not have to negotiate frame size. For example, the 802.11 NGV physical layer 402 is able to communicate an inter-layer NGV indication 406 to the WSMP layer 404, to indicate that the 802.11 NGV physical layer 402 supports frame aggregation for the OCB mode of operation.

In some examples, when the WSMP layer 404 receives a frame with NGV mode aggregated data frames supported from other devices (e.g., cars) in radio range, the WSMP layer 404 begins transmitting NGV mode aggregated frames. The transmitting of NGV mode aggregated frames is done by the WSMP layer 404 sending a larger amount of data, for example, in the form of optional extension fields with more information to the lower layer (e.g., 402). The larger amount of data can include multiple MSDUs from the WSMP layer 404 to the lower layer along with a flag or other indicator indicating the preference to aggregate these frames together. In other such examples, the inter-layer NGV indication 406 is in the form of the frame containing NGV mode aggregated data frames.

In other examples, WSMP provider service identifiers (PSIDs) can be used to provide the inter-layer NGV indication 406. Some applications (the application identified by PSID in the WSMP header) are designated to support frame aggregation. The WSMP layer 404 uses frame aggregation for those PSIDs.

As noted above, in some cases, the device 400 can negotiate the ability to support NGV frame aggregation with other devices (within a wireless range of the device 400). The device 400 can exchange capability information with another device, such as by setting bits to a particular value (or more generally, a new information element (IE)) within the A-MSPU header or A-MPDU header (or more generally, aggregated data frame header). This capability information can be referred to as an NGV mode indicator 408, which advertises the capabilities of a receiving device (such as the device 400) relating to performing data frame aggregation in the OCB mode. Therefore, any device that receives an aggregated data frame with the NGV mode indicator is made aware of the capabilities of the other receiving device.

In addition, new addressing NGV modes and device capability advertisements may be considered together with "interoperability with legacy (IEEE 802.11p) OCB devices—STAs".

Additions and changes are made to current IEEE 1609 amendments (e.g., 1609.3) as this standard uses IEEE 802.11p as a bearer. Updates to IEEE 802.11p also include changes to IEEE 1609.3.

Figure 5:
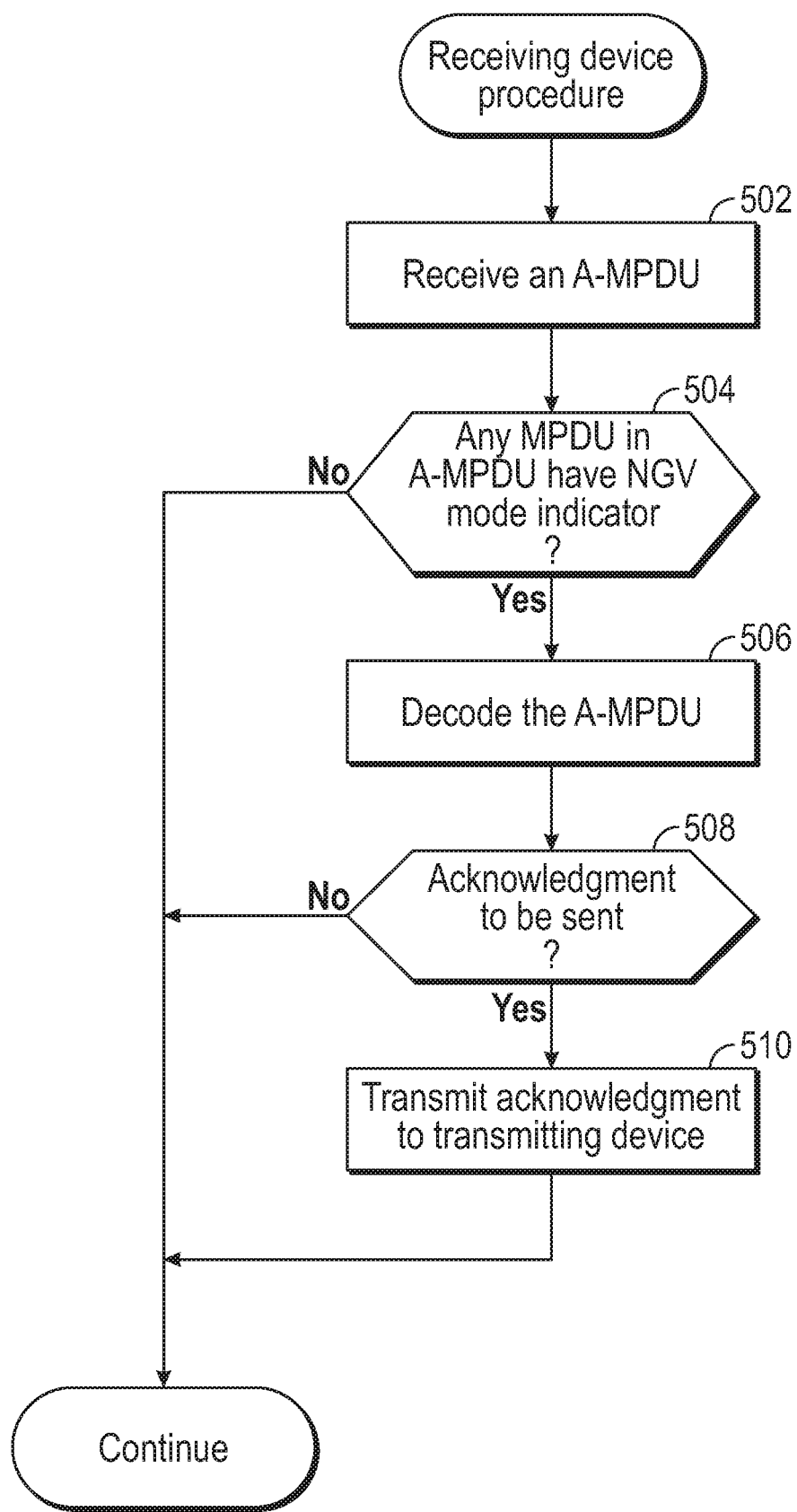
FIG. 5 is a flow diagram of a receiving device procedure according to some examples of the present disclosure.

See sections A.4 for detailed specification change suggestions 2.3 Example Procedures FIG. 5 shows an example procedure for processing an A-MDPU by a receiving NGV mode device (e.g., 400 in FIG. 4).

The NGV mode device receives (at 502) an A-MPDU.

The NGV mode device determines (at 504) whether any MPDU frame within the received A-MPDU has the NGV mode indicator (e.g., NGV mode bit(s) set to 1). If any MPDU frame within the received A-MPDU has the NGV mode indicator, the NGV mode device decodes (at 506) the A-MPDU.

As part of the decoding, the NGV mode device checks if one or more rules (see examples of rules in Sections A.2 and A.3 below) apply for the A-MPDU.

The NGV mode device determines (at 508) if the one or more rules of the A-MPDU specify that an acknowledgement is to be sent for the A-MPDU, such as based on presence of an UNACK indicator or UACK indicator in the A-MPDU as discussed above in Section 2.1.1 and 2.1.2.

If so, the NGV mode device transmits (at 510) an acknowledgment frame back to the transmitting device that sent the A-MPDU frame.

If the NGV mode device determines (at 504) that no MPDU frame within the received A-MPDU has the NGV mode indicator (e.g., the NGV mode bit(s) set to 0 in each MPDU frame), then the NGV mode device does not decode the A-MPDU and the processing of FIG. 5 ends.

Figure 6:
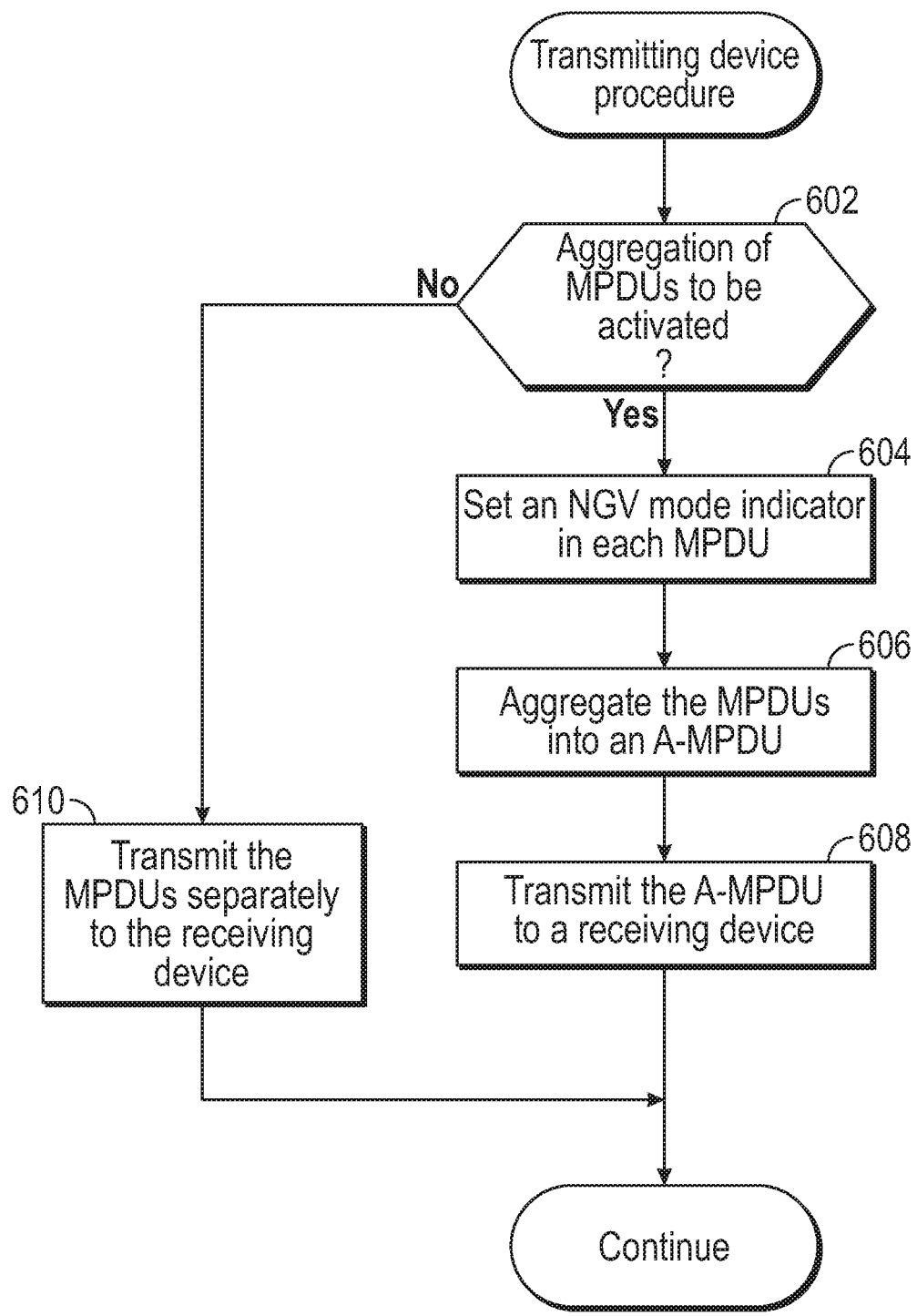
FIG. 6 is a flow diagram of a transmitting device procedure according to some examples of the present disclosure.

FIG. 6 is a flow diagram of a procedure for transmitting data by an NGV mode device (e.g., 400 in FIG. 4).

The NGV mode device has multiple MPDUs to transmit. The NGV mode device determines (at 602) whether aggregation of MPDUs is to be activated.

If the NGV mode device determines that aggregation of MPDUs is to be activated, the NGV mode device sets (at 604) an NGV indicator (e.g., NGV bit(s) set to a specified value) in each MPDU of the multiple MPDUs.

The NGV mode device then aggregates (at 606) the multiple MPDUs (each with the NGV indicator) into an A-MPDU.

The NGV mode device transmits (at 608) the A-MPDU to a receiving device.

If the NGV mode device determines (at 602) that aggregation of MPDUs is not to be activated, the NGV mode device transmits (at 610) the multiple MPDUs separately to the receiving device.

Modifications of the IEEE 802.11 specifications according to some examples are described below in Sections A.1 to A. 4.

A.1 IEEE 802.11bd

The IEEE 802.11bd amendment can be revised to add the following:

Define a new NGV PHY layer (extended OCB). Note that the new term may not be exactly "NGV" within the standards specification.

Define a plurality of new NGV mode data rates (MCS). Some data rates may allow aggregation, and some data rates may disallow aggregation.

Introduce A-MSDU and A-MPDU for the NGV mode. The frame headers of A-MSDU and A-MPDU would contain NGV capability information (e.g., broadcast type) that would advertise the mode of operation to other devices.

Introduce UNACK and UACK modes for A-MPDU transmission and reception.

In addition, new addressing modes and device capability advertisements (bits and information elements (IEs)) may be considered together with "interoperability with legacy OCB STAs".

Existing transmission opportunity (TXOP) limits can be changed for the longer aggregated frame transmission times.

A.2 IEEE 802.11REVmd D3.0

The current IEEE 802.11REVmd amendment is a roll-up of the IEEE 802.11-2016 baseline specification and all subsequent drafts that have been approved since December 2016. The current IEEE 802.11REVmd amendment will become the next IEEE 802.11 baseline in the future.

The following areas of the IEEE 802.11REVmd Specification can be changed to allow A-MSDU and A-MPDU operation in an NGV mode.

Define a new NGV PHY (extended OCB physical layer) clause.

Define the following new parameters:

MIB Variable: dot11NGVAggregationActivated (or equivalent)

In other words, an IEEE 802.11 variable that is used to indicate within a device that NGV mode frame aggregation is activated or not. Typically, this is a Boolean variable with a value of true meaning that aggregation is activated and false meaning that aggregation is not activated.

TXVECTOR FORMAT parameter "NGV" (or equivalent, for example "XXX")

In other words, a new TXVECTOR FORMAT parameter, which is a way in which IEEE 802.11 physical layers are differentiated from each other. The name of this parameter can be "NGV" or something similar.

4.3.17 STA Transmission of Data Frames Outside the Context of a BSS (this is a Section of the IEEE 802.11REVmd Specification).

Some of the frame transmission rules are changed to allow A-MPDU and A-MSDU frames.

9.3.3.13 Action Frame Format (this is a Section of the IEEE 802.11REVmd Specification).

Modify Table 9-45 (of the IEEE 802.11REVmd Specification) Action Frame body and Action No Ack Frame body to add action frames for NGV mode. This can be a copy of the entry for "Mesh" modified for NGV mode.

9.7.1 A-MPDU Format (this is a Section of the IEEE 802.11REVmd Specification).

The current definition of the A-MPDU format is depicted in Figures 9-970, 9-972, 9-973, and 9-974 of the IEEE 802.11REVmd Specification. Figures 9-970, 9-972, 9-973, and 9-974 are reproduced in FIG. 7 of the present application. Figures 9-973 and 9-974 in FIG. 7 are modified from the current standards.

Figure 7:
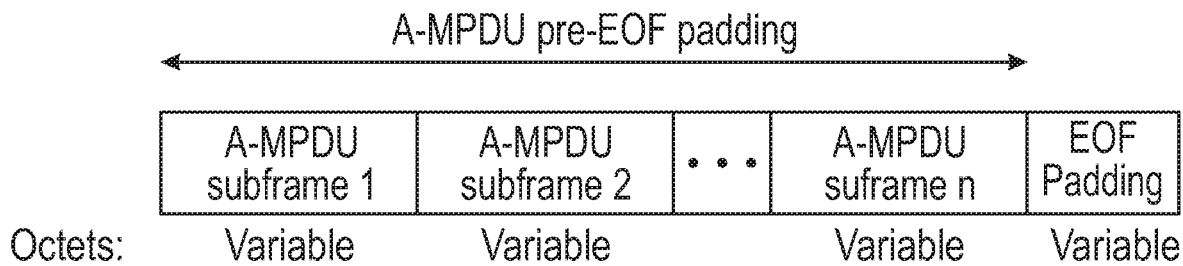
FIG. 7 is a block diagram of formats of frames and information elements according to some examples of the present disclosure.
Figure 7:
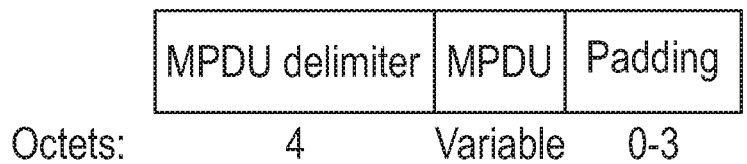
Figure 7:
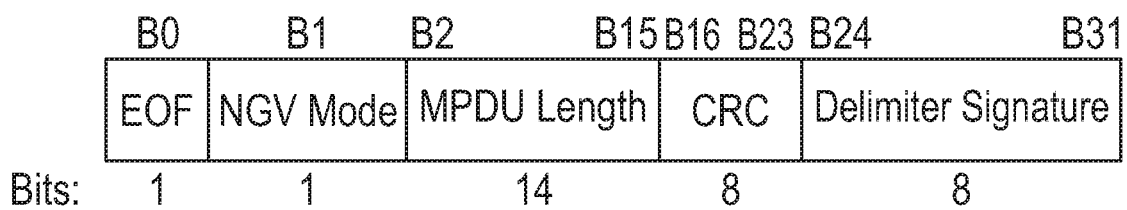
Figure 7:
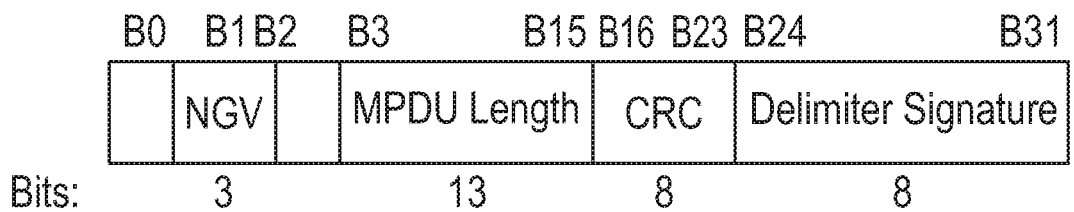

The "Reserved" bits within the MPDU delimiter subframes can be used to signal an NGV mode MPDU in Figures 9-973 and 9-974 of the IEEE 802.11REVmd Specification (reproduced in FIG. 7 of the present application).

Within Figure 9-973 of the IEEE 802.11REVmd Specification, bit B1 can be set to zero to indicate no NGV mode to retain compatibility with existing systems, or set to another value to indicate NGV mode operation.

Within Figure 9-974 of the IEEE 802.11REVmd Specification, bit B1 can be set to zero to indicate no NGV mode to retain compatibility with existing systems, or set to another value to indicate NGV mode operation. However, bit B0 or B2 can also be used to indicate compatibility. Other combinations of these bits or other bits can also be used.

In addition to the NGV mode bits, other bits within the MPDU header can also be used to indicate the UNACK and UACK modes (the UNACK indicator and UACK indicator of Sections 2.1.1 and 2.1.2 above) for A-MPDU transmission and reception.

9.7.3 A-MPDU Contents (this is a Section of the IEEE 802.11REVmd Specification).

Make the following change in underlined text:

"In a non-DMG PPDU, an A-MPDU is a sequence of A-MPDU subframes carried in a single PPDU with one of the following combinations of RXVECTOR or TXVECTOR parameter values:

The FORMAT parameter set to VHT

The FORMAT parameter set to HT_MF or HT_GF and the AGGREGATION parameter set to 1

The FORMAT parameter set to SIG, S1G_DUP_1M, or S1G_DUP_2M and the AGGREGATION parameter set to 1(11ah)

The FORMAT parameter set to NGV"

10.11 A-MSDU Operation (this is a Section of the IEEE 802.11REVmd Specification).

Various rules within this clause are updated to allow A-MSDU operation for NGV devices (STAs). This clause currently calls out A-MSDU behavior for specific types of devices (STAs), but excludes OCB devices.

For example, make the following changes in underlined text:

"The following rules in this paragraph apply to the transmission of an A-MSDU:

A non-DMG and non-S1G STA and non-NGV STA that has a value of false for dot11HighthroughputOptionImplemented shall not transmit an A-MSDU.

A non-DMG and non-S1G STA and non-NGV STA shall not transmit an A-MSDU to a STA from which it has not received a frame containing an HT Capabilities element."

An alternative can be to re-write this paragraph as follows:
"The following rules in this paragraph apply to the transmission of an A-MSDU:
 Any STA (except: DMG, S1G and NGV) that has a value of false for dot11HighthroughputOptionImplemented shall not transmit an A-MSDU.
 Any STA (except: DMG, S1G and NGV) shall not transmit an A-MSDU to a STA from which it has not received a frame containing an HT Capabilities element."

11.19 STAs Communicating Data Frames Outside the Context of a BSS (this is a Section of the IEEE 802.11REVmd Specification).

Some of the frame transmission rules are changed to allow A-MPDU frames.

For example, a new paragraph can be added to this clause as follows:
When dot11NGVAggregationActivated is true in a STA:
The STA may send A-MSDU and A-MPDU frames.

A.3 IEEE 802.11ax D5.0

There are some clauses of the new IEEE 802.11ax draft that should also be considered to be changed for the NGV mode.

26.5.4.5 Additional Considerations for Unassociated STAs (this is a Section of the IEEE 802.11ax Specification).

This clause defines unassociated STA behavior that appears related to some new BlockAck procedures. This suggests that A-MPDUs can be used in an unassociated state without acknowledgements. The addition of rules for the NGV mode should be considered within this clause.

For example, a new paragraph can be added to this clause as follows:
When dot11NGVAggregationActivated is true in a STA that receives an A-MPDU from an unassociated NGV STA shall respond with a UACK frame.

26.6.3.3 Non-Ack-Enabled Multi-TID A-MPDU Operation (this is a Section of the IEEE 802.11ax Specification).

As part of the new Multi-STA BlockAck procedures, IEEE 802.11ax defines "Non-ack-enabled multi-TID A-MPDU operation," although there are complex rules and exceptions. The new NGV mode may have to adopt these rules to allow Multi-STA BlockAck procedures, which would be required if an NGV STA is developed from an HE (IEEE 802.11ax) STA.

For example, make the following changes in underlined text:
A non-ack-enabled multi-TID A-MPDU is an A-MPDU that meets the following conditions:
 Contains non-EOF MPDUs that are QoS Data frames that belong to two or more block ack agreements and that have the Ack Policy field set to Implicit Block Ack Request, HTP Ack, or Block Ack
 Does not contain a Management frame that is not an Action No Ack frame
 Does not contain an EOF-MPDU that is a QoS Data frame with the Ack Policy field set to Normal Ack or HTP Ack
 Contains non-EOF MPDUs that are QoS Data frames when dot11NGVAqqreqationActivated is true."

A.4 IEEE 1609.3

There are some clauses of the IEEE 1609.3 that should also be considered to be changed for the NGV mode.

8.2.2.6.5 NGV Mode (this is a Section of the IEEE 1609.3 Specification).

A new WAVE Information Element Extension can be added to the WAVE Service Advertisement (WSA) frame, which can be transmitted by a device to another device to advertise support for the NGV mode. This would enable a device to advertise that it supports the NGV mode capability (in other words, work with the new IEEE 802.11 NGV mode).

This field provides the NGV mode capability information and is encoded as specified in the table below that represents an NGV mode capability format:

|  | WAVE Element ID = 8 | Length (1) | NGV mode |
|---|---|---|---|
| Octets: | 1 | 1 | 1 |

NGV mode specifies the capability of the device and is a 1-octet length bit mask.

The format of the bit mask (MAC address Policy field format) is set forth in the table below:

| NGV mode bits | Description of bit |
|---|---|
| 0 | NGV mode |
| 1 | UACK |
| 2 | UNACK |
| 3-7 | Reserved |

Bit 0 when set to 1, indicates that NGV mode is used.
Bit 1 when set to 1, indicates that UACK can be used with NGV mode.
Bit 2 when set to 1, indicates that UNACK can be used with NGV mode.

8.3.4.1 General (this is a Section of the IEEE 1609.3 Specification).

Modify the second paragraph to add the NGV mode element as an optional header element:
The WSMP-N-Header may include the following WAVE Information Elements:
 Channel Number (see 8.3.4.2)
 Data Rate (see 8.3.4.3)
 Transmit Power Used (see 8.3.4.4)
 Channel Load (see 8.3.4.5)
 NGV header (see 8.2.2.6.5).

3. General Architecture

Figure 8:
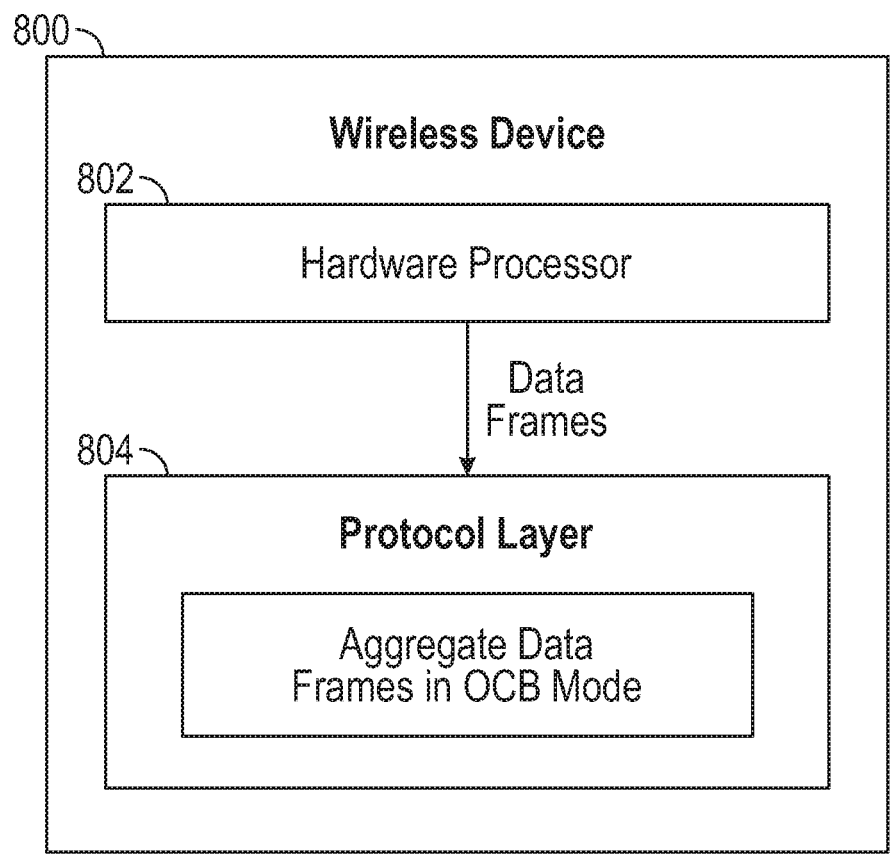
FIG. 8 is a block diagram of a wireless device according to some examples of the present disclosure.

FIG. 8 is a block diagram of a wireless device 800 that is able to support the NGV mode of some implementations of the present disclosure.

The wireless device 800 includes a hardware processor 802. A hardware processor can include a microprocessor, a core of a multi-core microprocessor, a microcontroller, a programmable integrated circuit, a programmable gate array, a digital signal processor, or another hardware processing circuit.

The hardware processor 802 can provide data frames for communication to another wireless device. For example, the hardware process 802 can execute machine-readable instructions (e.g., an application program, an operating system, etc.) that produces the data frames for communication.

The wireless device 800 includes a protocol layer 804 to aggregate the data frames into an aggregated data frame for communication in an Outside the Context of a Basic Service Set (OCB) mode. The protocol layer 804 can be implemented in hardware or as a combination of hardware and machine-readable instructions executable on the hardware.

Machine-readable instructions can be stored in a non-transitory machine-readable storage medium of the wireless device 800.

The storage medium can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disc (CD) or a digital video disc (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A method comprising:
   aggregating, by a first device, a plurality of data frames into an aggregated data frame for communication in an Outside the Context of a Basic Service Set (OCB) mode;
   transmitting, from the first device to a second device, an information element set to a value to provide capability information to the second device indicating support by the first device for aggregation of data frames in the OCB mode;
   transmitting, from the first device to the second device, a management or control frame with an indicator of an acknowledged mode for the OCB mode to cause operation in the acknowledged mode for the OCB mode; and
   transmitting, by the first device to the second device, the aggregated data frame in the OCB mode and in the acknowledged mode.

2. The method of claim 1, wherein aggregating the plurality of data frames comprises removing Medium Access Control (MAC) headers of the plurality of data frames and aggregating remaining portions of the plurality of data frames without the MAC headers into the aggregated data frame.

3. The method of claim 2, wherein the aggregated data frame is an Aggregate MAC Service Data Unit (A-MSDU).

4. The method of claim 1, wherein aggregating the plurality of data frames comprises aggregating the plurality of data frames with Medium Access Control (MAC) headers into the aggregated data frame.

5. The method of claim 4, wherein the aggregated data frame is an Aggregate MAC Protocol Data Unit (A-MPDU).

6. The method of claim 1, wherein the information element is included in a header of the aggregated data frame.

7. The method of claim 1, further comprising:
   receiving a further aggregated data frame;
   in response to detecting an information element in the further aggregated data frame specifying that the further aggregated data frame includes an aggregation of data frames in the OCB mode:
      apply a rule to decode the further aggregated data frame.

8. The method of claim 7, further comprising:
   determining whether to transmit an acknowledgment of the further aggregated data frame based on the rule.

9. The method of claim 1, wherein the first device is a wireless device, the method further comprising:
   sending, from a first protocol layer of the wireless device to a second protocol layer of the wireless device, an indication of a capability relating to support for aggregation of data frames in the OCB mode.

10. The method of claim 9, wherein the second protocol layer is a Wave Short Message Protocol (WSMP) layer, and the first protocol layer is a Medium Access Control (MAC) layer.

11. A first wireless device comprising:
    a hardware processor to provide data frames for communication to a second wireless device; and
    a protocol layer to:
       aggregate the data frames into an aggregated data frame for communication in an Outside the Context of a Basic Service Set (OCB) mode,
       transmit, from the first wireless device to the second wireless device, an information element set to a value to provide capability information to the second wireless device indicating support by the first wireless device for aggregation of data frames in the OCB mode,
       transmit, from the first wireless device to the second wireless device, a management or control frame with an indicator of an acknowledged mode for the OCB mode to cause operation in the acknowledged mode for the OCB mode, and
       transmit, from the first wireless device to the second wireless device, the aggregated data frame in the OCB mode and in the acknowledged mode.

12. The first wireless device of claim 11, wherein the management or control frame is an action frame.

13. A non-transitory machine-readable storage medium comprising instructions that upon execution cause a first wireless device to:
    aggregate data frames into an aggregated data frame for communication in an Outside the Context of a Basic Service Set (OCB) mode;
    transmit, from the first wireless device to a second wireless device, an information element set to a value providing capability information to the second wireless device indicating support by the first wireless device for aggregation of data frames in the OCB mode;
    transmit, from the first wireless device to the second wireless device, a management or control frame with an indicator of an acknowledged mode for the OCB mode to cause operation in the acknowledged mode for the OCB mode; and
    transmit, from the first wireless device to the second wireless device, the aggregated data frame in the OCB mode and in the acknowledged mode.

* * * * *